United States Patent [19]
Smith

[11] 3,925,734
[45] Dec. 9, 1975

[54] OSCILLATOR DEVICE FOR GENERATING SIGNALS OF A PRECISE FREQUENCY

[76] Inventor: Scudder Smith, 1100 Lake Shore Drive, Menasha, Wis. 54952

[22] Filed: Jan. 9, 1974

[21] Appl. No.: 432,058

[52] U.S. Cl. .................. 331/41; 331/40; 331/53; 331/116 M; 331/156; 331/157
[51] Int. Cl.² .......................................... H03B 5/36
[58] Field of Search ........... 331/163, 41, 116 M, 53, 331/40, 156, 157

[56] References Cited
UNITED STATES PATENTS

| | | | |
|---|---|---|---|
| 3,296,549 | 1/1967 | Johnson | 331/41 |
| 3,602,842 | 8/1971 | Smith | 331/156 |
| 3,826,931 | 7/1974 | Hammond | 331/163 |

*Primary Examiner*—John Kominski
*Attorney, Agent, or Firm*—Ostrolenk, Faber, Gerb & Soffen

[57] ABSTRACT

Oscillator devices for generating signals of a precise frequency. The device produces two outputs of differing frequencies. The two signals are combined to develop a beat frequency representing the difference therebetween. The device has built-in compensation means to provide compensating deviations in each of the frequency outputs to eliminate deviations in the resulting beat frequency. Frequency division and/or multiplication of the discrete generated signals is employed to obtain the desired precise beat frequency.

16 Claims, 31 Drawing Figures

U.S. Patent  Dec. 9, 1975  Sheet 1 of 8  3,925,734
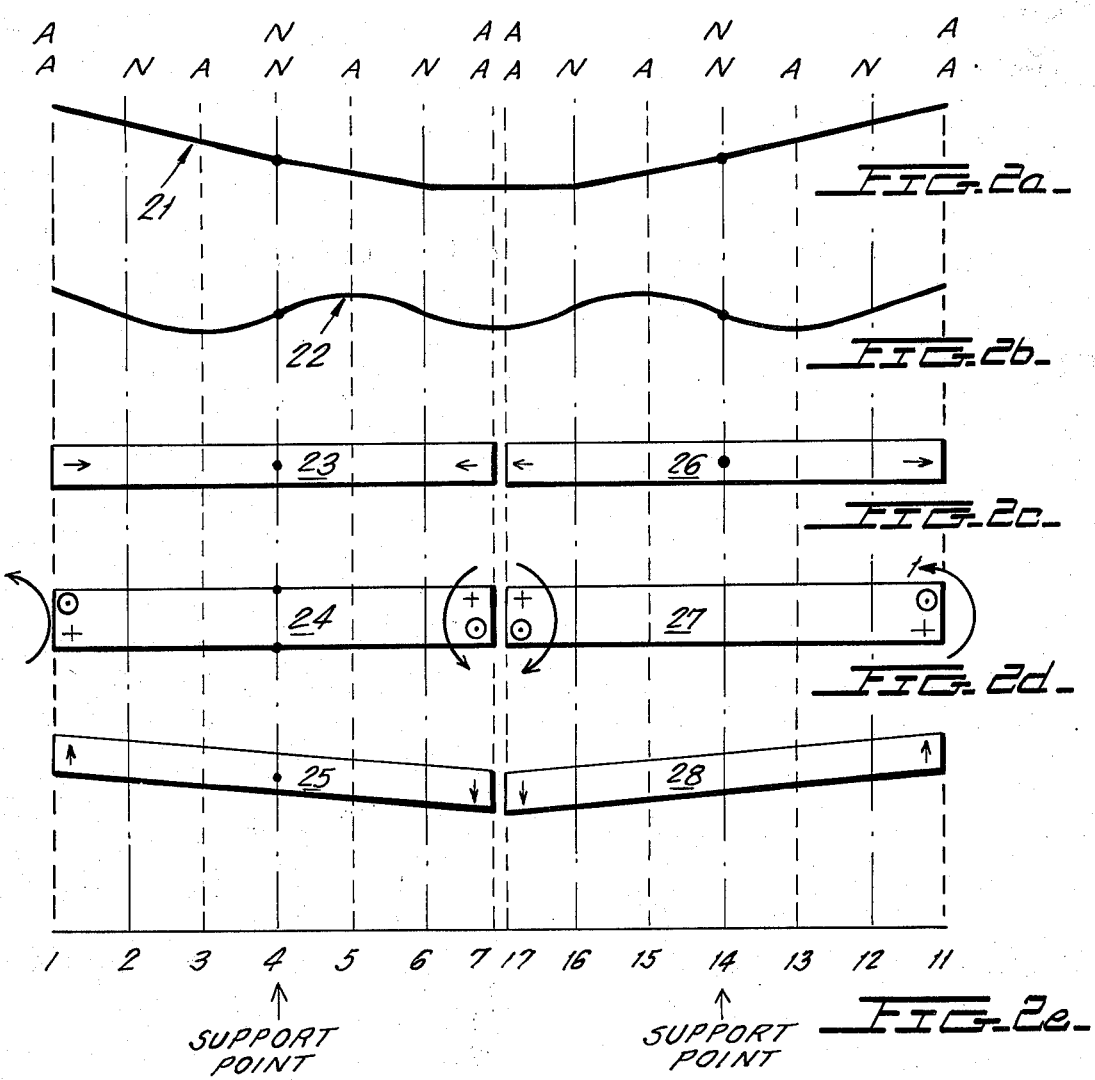

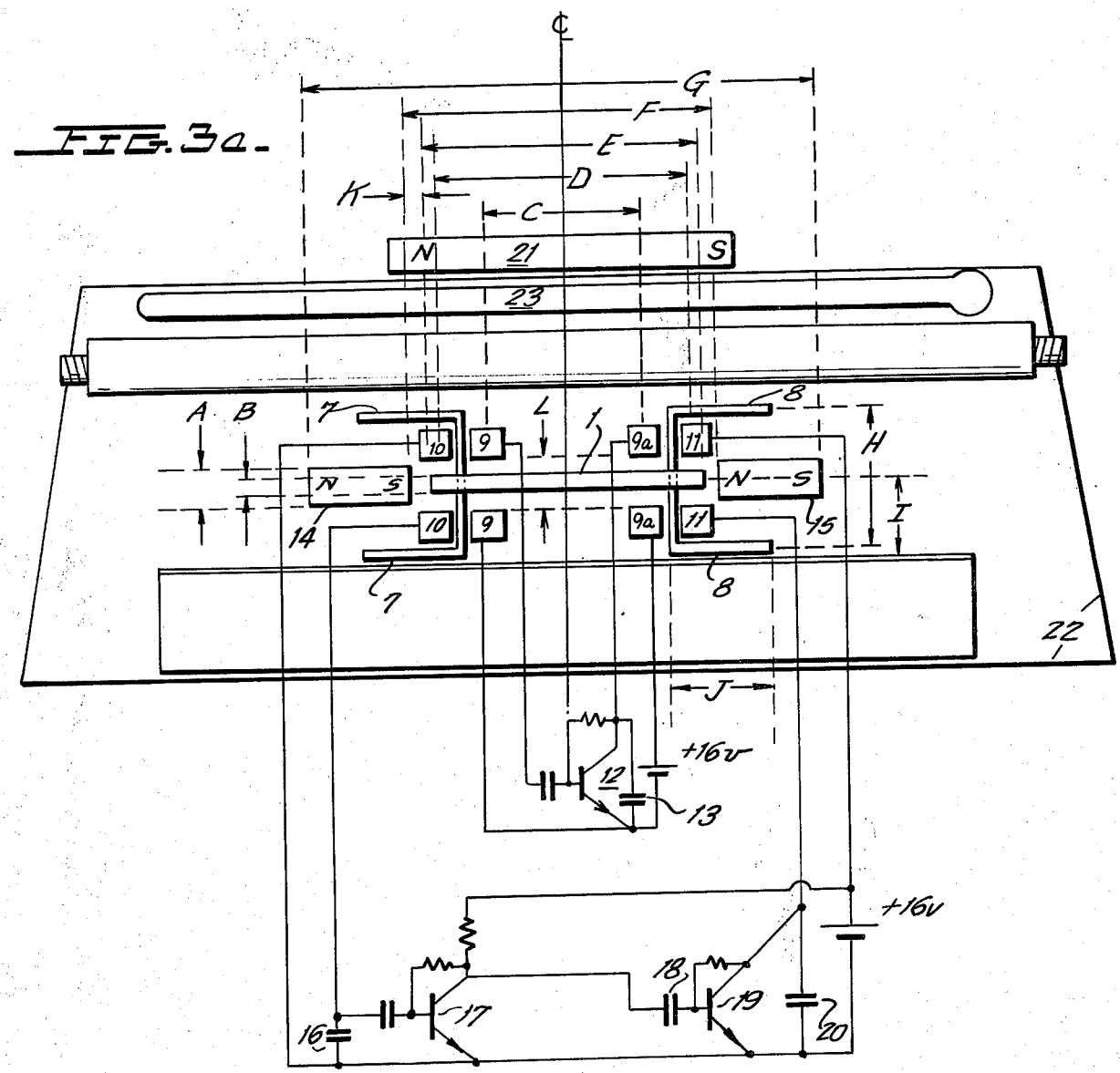
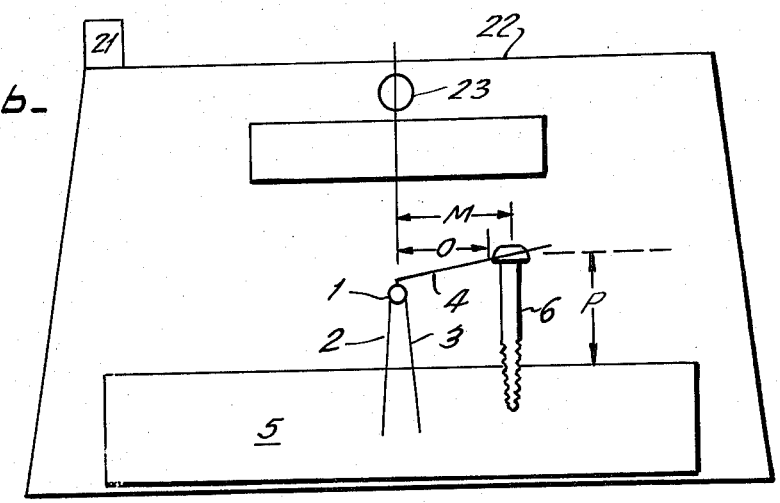

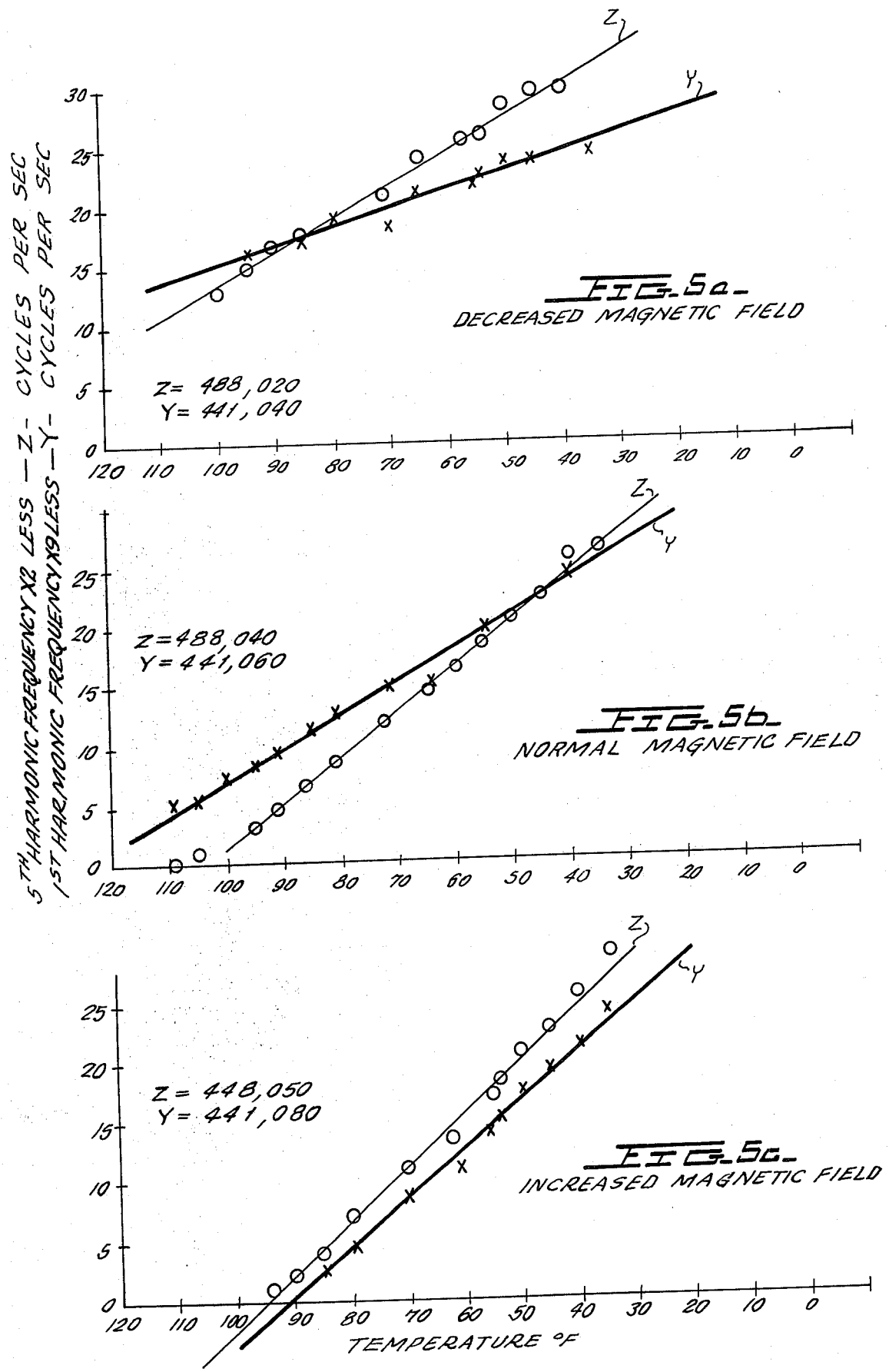

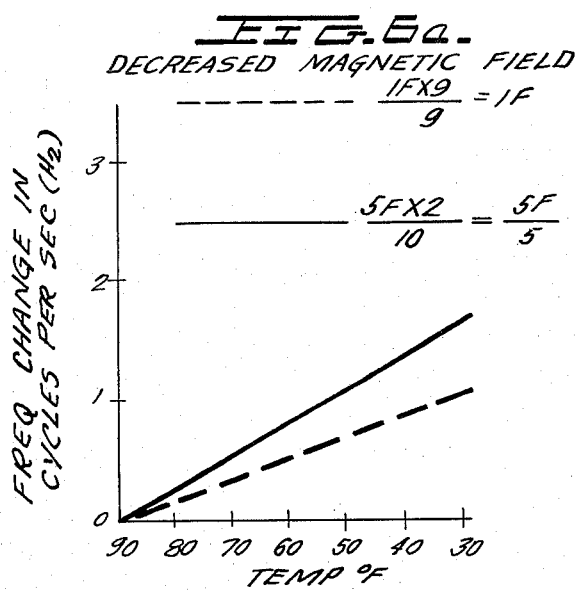
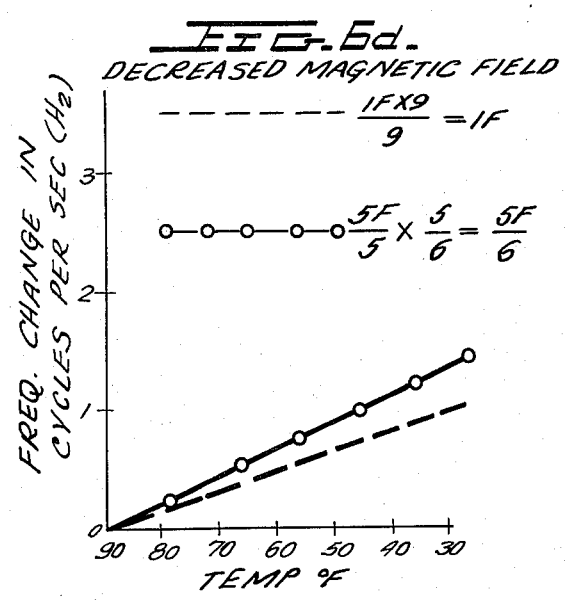
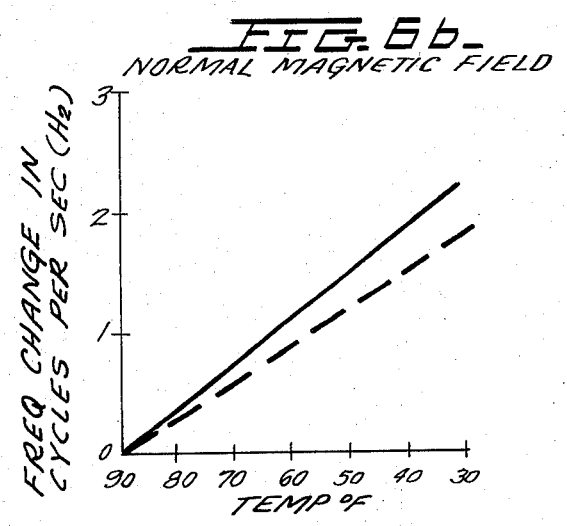
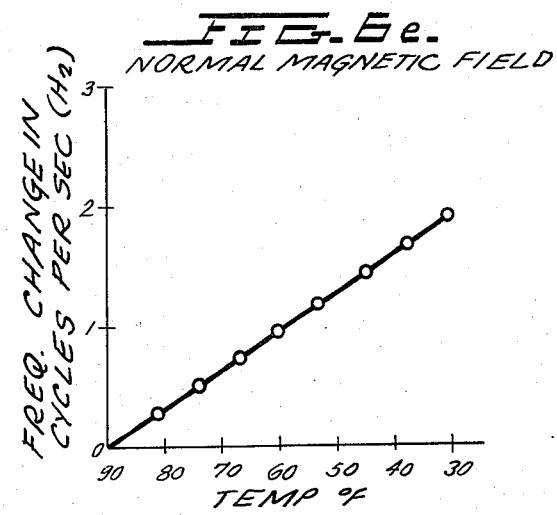
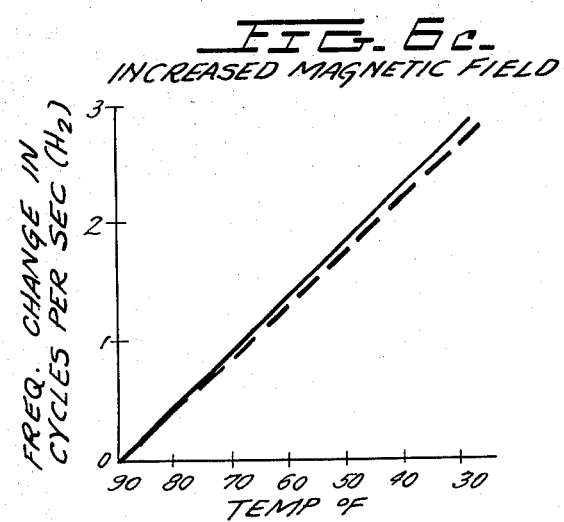
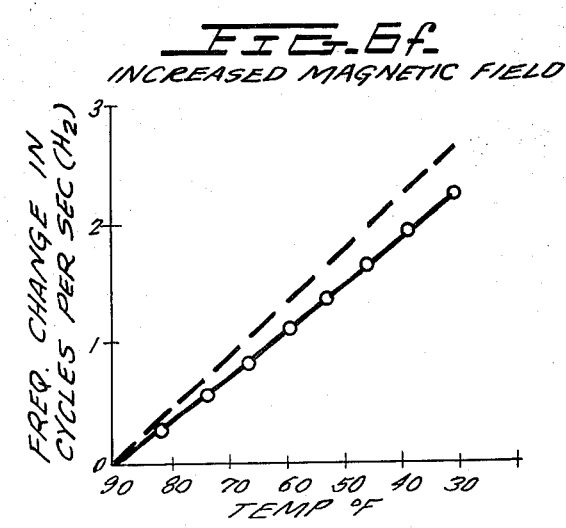

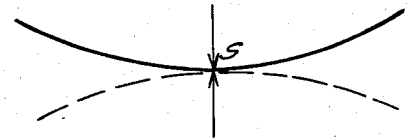
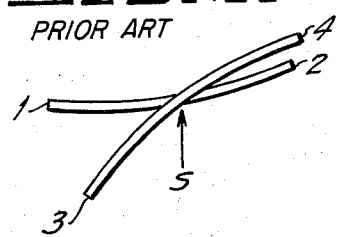
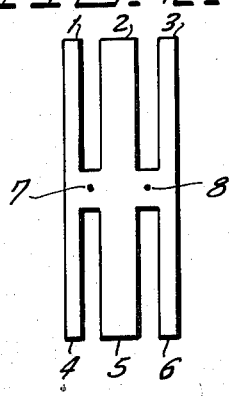
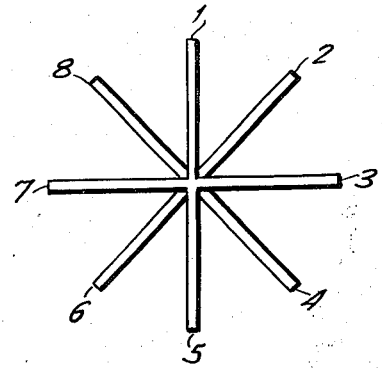
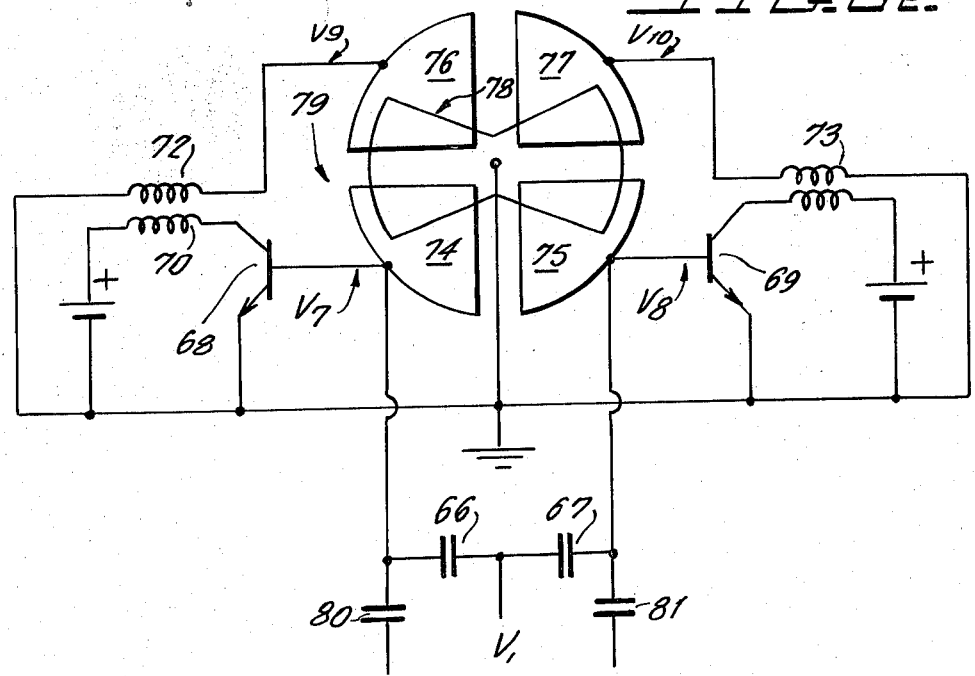

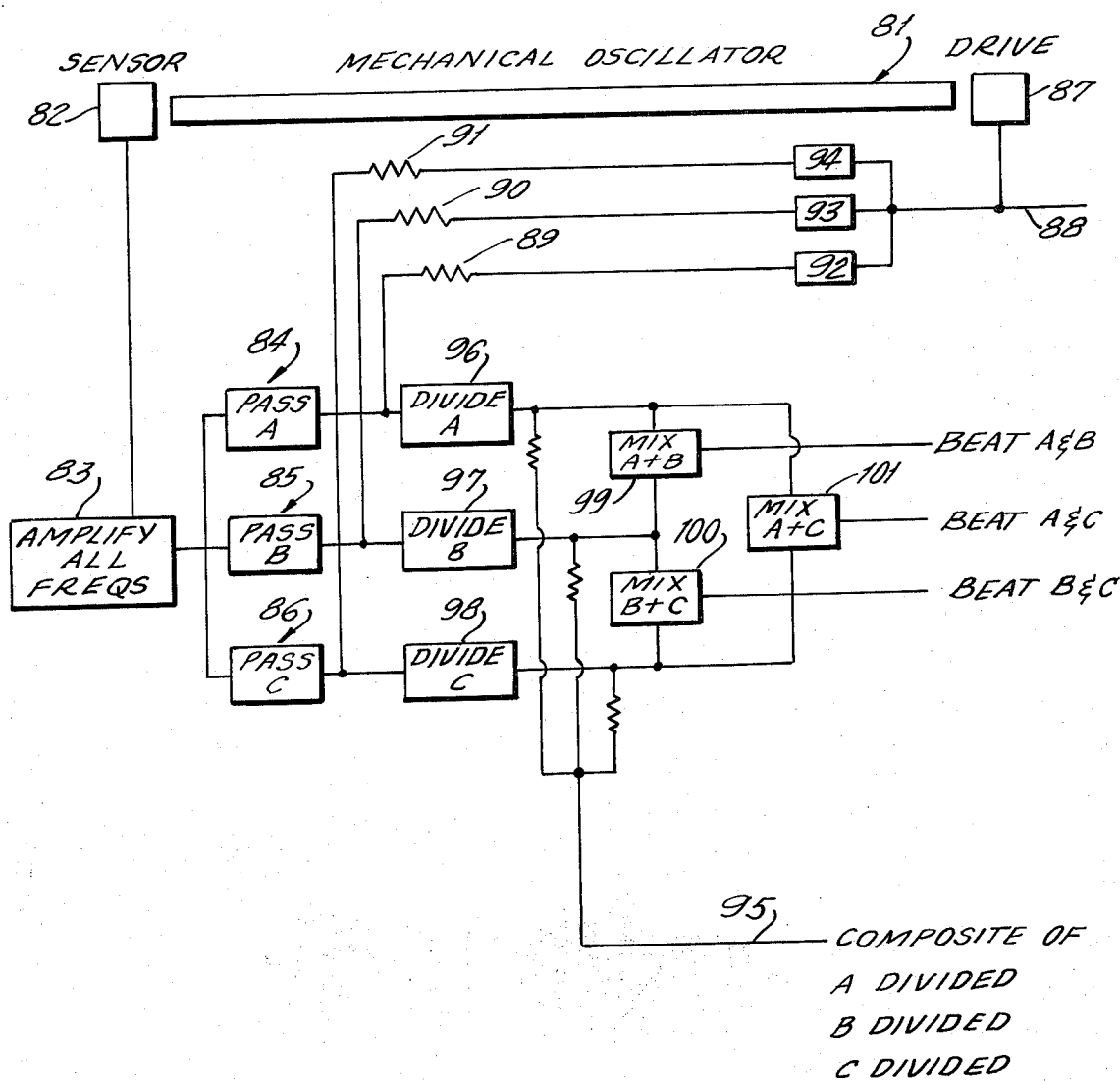

OSCILLATOR DEVICE FOR GENERATING SIGNALS OF A PRECISE FREQUENCY

This invention relates to the generation, detection and use for mainly frequency control and timing purposes of constant oscillation frequencies which vary minimally with changes in ambient or environmental conditions.

Two separate members, or two parts of a connected single member, or two separate oscillatory modes within a single member, are caused to electronically or electromechanically oscillate or vibrate at separate distinct frequencies for each of the two members, parts of a member, or modes within a single member. Any method may be used to produce the two frequencies, such as a quartz crystal oscillator or the generation of two vibratory modes (harmonics or overtones) within a single structure as disclosed in my U.S. Pat. No. 3,602,842. Motion sensing means and driving force may utilize direct magnetic forces, magnetostriction, piezoelectricity, electrostatics, or electrostriction. Electrostriction is tension tending to stretch a solid dielectric in the direction of the lines of force of the field in which it is placed. See page 51, *Principles of Electricity*, Page and Adams, Fourth Printing, D. Van Nostrand Company, Inc.

After optional and preferably differential frequency division, the two separate divided frequencies are combined to produce a beat frequency which is the difference between the two frequencies. This beat frequency is lower than and may be made infinitely more accurate than either of the primary frequencies.

It has been thought by many persons skilled in the art that a beat frequency is less accurate than either primary frequency. This is true if the primary frequencies vary at random from each other. For example, if one frequency is 11,000 Hz and the other is 10,000 Hz, the beat frequency (i.e., difference) is 1,000 Hz. If now either primary varies by 1/1000, the 11,000 may go up to 11,011 while the 10,000 may go up to 10,010 or down to 9,990. The new beat frequency may be as high as 11,011 - 9,990 or 1,021, the variation being by a factor of approximately 20/1000 as compared to 20/10,000 total possible change in a primary frequency.

Thus, beat error may be greater than the primary error by a factor of 10.

In the case where the primary frequencies vary proportionately, for one primary change by $10,000 \times 1/1000 = 10$ and the other by $11,000 \times 1/1000 = 11$, there is a change in beat frequency of $11 - 10 = 1$ Hz. $1/1000 = 10/10,000$. Thus, the proportional error in the beat equals the proportional error in a primary frequency.

Now if the higher frequency changes by an amount which is less than the lower frequency in the ratio of LOWER FREQUENCY/HIGHER FREQUENCY, there is then no change in the beat frequency. For example, if 10,000 Hz increases by 1/1000 to 10,010 and 11,000 Hz increases by $10,000/11,000 \times 1/1000$ or by 1/1100 to 11,010, the beat frequency remains at $11,010 - 10,010 = 1000$.

Thus, a principal aspect and objective of this invention is the use of a beat frequency to achieve greater accuracy than either of the primary frequencies. An additional aspect of the invention is that in some instances a considerably lower beat frequency results. This eliminates division stages, thereby reducing the number of components required, saving on cost, reducing size, and providing longer battery or cell life.

BRIEF DESCRIPTION OF THE FIGURES

The above as well as other objects of the present invention will become apparent when reading the accompanying description and drawings in which:

FIG. 1 is a plot showing waveforms useful in describing the principles of the present invention;

FIGS. 2a-2e show frequency generating devices incorporating the principles of the present invention;

FIGS. 5a-5c show plots of experimental data useful in explaining the results of the invention in actual use;

FIGS. 6a-6f are plots relating frequency change to temperature and which are useful in describing the advantages of the present invention;

FIGS. 7a-7e show other alternative embodiments for the discrete frequency generating devices of the present invention.

FIG. 8b shows a system employing a device of the type shown in FIG. 8a;

FIG. 8e shows another alternative arrangement for the present invention.

FIG. 9 shows in block form a general circuit arrangement applicable to all embodiments.

DETAILED DESCRIPTION OF THE FIGURES

Figure 3C:
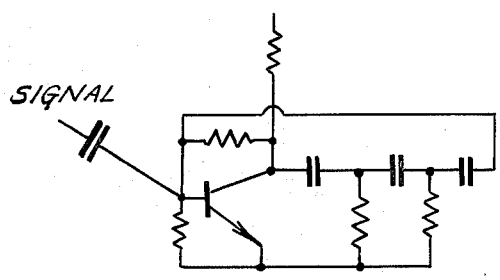
FIGS. 3b and 3c show schematics of phase bands and phase advance or delay oscillators which may be employed in the embodiment of FIG. 3.

A detailed description of the figures of the present invention will now be given. For describing the figures, the underlying principles will be initially developed as set forth hereinbelow.

THEORETICAL CONSIDERATIONS

For a higher sinusoidal frequency V added to a lower sinusoidal frequency U, a difference (beat) frequency results $$D' = \sin V + \sin U = 2 \sin \tfrac{1}{2}(V+U)\cos \tfrac{1}{2}(V-U)$$

or a frequency the average of V and U modulated by $\tfrac{1}{2}(V-U)$ as illustrated in FIG. 1.

Since the $$\frac{V+U}{2}$$

frequency oscillates from positive to negative within the plus and minus envelopes of D', there are two "beats" per complete cycle of D', making an effective beat $$D = 2 \times \tfrac{1}{2}(V-U)$$
$$D = V-U \quad (1)$$

The number of full cycle waves within one beat is:

$$n = \frac{V+U}{4(V-U)} \quad (2)$$

In FIG. 1 are shown two and one half waves of the $$\frac{V+U}{2}$$

frequency for one beat. Let there now be two frequencies V and U which may have been divided from primary frequencies, each of which is a multiple of a common (nominal fundamental) frequency F. Let the higher of these frequencies be $$V = \frac{BF}{N}$$

and let the lower of these frequencies be $$U = \frac{AF}{M}.$$

A and B need not be integers for two separate members or parts of a member. For a single member (rod), A and B are the approximate integers by which the fundamental frequency is multiplied to obtain the frequency of a given higher mode or overtone. N and M are division integers.

For two modes within a single structure, the higher modes are not exact multiples of the fundamental. Since they are usually fairly close to exact multiples, for simplicity, it will be assumed in the following discussion that higher modes are integral multiples of a common fundamental F.

For a given condition of the environment, the difference frequency is:

$$D_1 = \frac{BF}{N} - \frac{AF}{M}$$

For a different condition of the environment:

$$D_2 = \frac{B(F+b+eb)}{N} - \frac{A(F+a)}{M}$$

where:
b is a factor which causes the higher frequency to change by $$\frac{Bb}{N};$$

(a) is a factor causing the lower frequency to change by $$\frac{Aa}{M};$$

(e) is a proportional error in (b) from that value of (b) relative to (a) yielding a zero change in (D) for the given change in environment.

The change in (D) is:

$$D_2 - D_1 = \left(\frac{BF}{N} - \frac{AF}{M}\right) + \frac{Bb(1+e)}{N} - \frac{Aa}{M} - \left(\frac{BF}{N} - \frac{AF}{M}\right)$$

$$D_2 - D_1 = \frac{Bb(1+e)}{N} - \frac{Aa}{M}$$

Let e temporarily $= 0$, let $D_2 - D_1 = 0$ $$\frac{Bb}{N} - \frac{Aa}{M} = 0$$

then, $$a = \frac{MB}{AN}b \quad (3)$$

rewritten $$a = \frac{BF}{N}b \bigg/ \frac{AF}{M} \quad (4)$$

or $$b = \frac{AF/M}{BF/N}a \quad (5)$$

Thus, from equation (5) the ("b") factor of the higher frequency should be made less than the ("a") factor of the lower frequency in the ratio Lower Frequency/Higher Frequency. Substituting $a = MB/AN$ b in the $D_2 - D_1$ equation above; the proportional change in beat is:

$$\frac{D_2 - D_1}{D_1} = \frac{\frac{Bb(1+e)}{N} - \frac{A}{M} \cdot \frac{MB}{AN}a}{\frac{BF}{N} - \frac{AF}{M}}$$

$$= \frac{Bb\epsilon}{N} \bigg/ \left(\frac{BF}{N} - \frac{AF}{M}\right)$$

Using the higher of the two divided frequencies, a division factor R may be defined as $$R = \frac{\text{Higher Frequency}}{\text{Beat Frequency}}$$

or $$R = \frac{\frac{BF}{N}}{\frac{BF}{N} - \frac{AF}{M}} = \frac{B/N}{B/N - A/M} \quad (6)$$

A factor of merit or quality Z by which the beat frequency is more accurate than the higher divided frequency is the proportional change in the primary frequency divided by the proportional change in the beat frequency, i.e.:

$$Z = \frac{\frac{b}{F}}{\frac{D_2 - D_1}{D_1}}$$

where: $b/F$ is the proportional change in the higher frequency; and $$\frac{D_2 - D_1}{D_1}$$

is the proportional change in the beat frequency.

$$Z = \frac{b/F}{\frac{Bb}{N}\epsilon \Big/ \left(\frac{BF}{N} - \frac{AF}{M}\right)}$$

$$Z = \frac{1}{\left(\frac{B/N}{B/N - A/M}\right)\epsilon}$$

(substituting from equation (6)

$$Z = \frac{1}{R\epsilon} \qquad (7)$$

Thus, the lower the value of R and the lower the value of $\epsilon$, the higher will be the factor of merit Z.

Frequency Sources

Several types of primary frequency sources are possible:

1. Two separate but virtually equivalent sources. Beating can be achieved after differential frequency division.
2. Two separate sources whose frequencies are different from each other. Beating can be achieved with or without frequency division. The separate frequency sources may be parts of a single structure. See, for example, my U.S. Pat. No. 3,602,842, FIGS. 3 and 4.
3. Two separate vibratory modes in one structure.

This latter method is preferred for the following reasons:

a. Less cost — one unit instead of two.
b. Smaller size — one unit instead of two.
c. The use of vibratory modes which are either odd-numbered or are odd-numbered times 2 (i.e., 2, 6, 10, 14, etc.) permits frequency division by any integers, by part non-$2^n$ and part $2^n$ integers, or entirely by division by $2^n$ integers.
d. There is automatic and rapid change in one frequency proportional to the change in the other frequency in the same direction for ambient changes —— except for an intentional compensating change in one or the other or both modes to provide for zero change in the beat.

FREQUENCY DIVISION METHODS

The following discussion is applicable to any method of producing frequencies, but is limited for convenience to odd harmonics generated preferably in a single structure.

Several frequency division methods may be employed:

1. A higher harmonic may be divided by simple integers and beat against the fundamental frequency F. As examples, note the following:

$$F - \frac{3F}{4} = \frac{F}{4} \quad \text{Binary Division}$$

$$\frac{5F}{4} - F = \frac{F}{4} \quad ''$$

$$F - \frac{5F}{6} = \frac{F}{6} \text{—Non-} \quad ''$$

$$F - \frac{7F}{8} = \frac{F}{8} \quad ''$$

$$\frac{9F}{8} - F = \frac{F}{8} \quad ''$$

etc.

Most of the dividers are multiples of 2, which is useful for binary division.

2. Two higher harmonics may be divided by simple integers and beat together.

| | | | |
|---|---|---|---|
| 3F/2−5F/4 = 6F/4 − 5F/4 | =F/4 | | Binary Division |
| 5F/6−3F/4 = | =F/12 | Non- | '' |
| 7F/8−3F/4 = | = F/8 | | '' |
| 7F/8−5F/6 = | = F/24 | Non- | '' |

To list a few examples, some of which are divisions by multiples of 2.

3. Two separate but approximately equal frequencies may be divided one by $(x-1).(x+1)$ or $x^2-1$ and the other by $x^2$ and beat together.

$$\text{BEAT FREQ} = \frac{F}{x^2-1} - \frac{F}{x^2} = \frac{F}{x^2(x^2-1)}$$

4. Where one primary frequency is the fundamental or first harmonic and the other is a higher harmonic, the number of the higher harmonic can be the $x-1$ or the $x+1$ of the method of 3 above. For example, with the first and third harmonics $$1F = \frac{3F}{3}$$

designating the denominator 3 above as $x+1$, then $x-1$ is 1 and $x$ is 2. Designating denominator 3 as $x-1$, then $x+1$ is 5 and $x$ is 4.

$$1F = \frac{3F}{3}$$

may then be divided by 5, and 3F is divided by $4^2$, thus:

$$\text{Beat} = \frac{3F}{3\times 5} - \frac{3F}{4^2} = \frac{F}{80}$$

For the 1st and 5th harmonics we can choose either $$\text{Beat} = \frac{5F}{5 \times 3} - \frac{5F}{4^2} = F/48$$

or $$\text{Beat} = \frac{5F}{5 \times 7} - \frac{5F}{6^2} = F/252$$

Another convenient division method is -

Divide the harmonics by their numbers to get the frequencies approximately equal. For example, suppose 3F is to be beat against 5F —

Dividing 3F and 5F by 3 and 5, respectively, we get 3F/3 and 5F/5. Then multiplying 5F by 5/6 we get 3F/3 vs. 5F/5 × 5/6 which yields 3F/3 vs. 5F/6. This is the same as 3F vs. 5F/2 = 6F/2 − 5F/2 = F/2

Division by 5, 6 or 7 can be achieved each by a simple single stage electronic divider circuit.

The beat frequency is the same as if a single frequency of F were divided by the same total division factor. Thus, we get the bonus of the advantages of beating with no more division stages than for a single primary frequency. Furthermore, the division stages for this beating method are at higher frequencies than the final stage of a division from a single frequency making for smaller division components.

Design Considerations

In designing a suitable beat frequency timing device, the mathematical factors to be considered are:

Beat frequency $V - U$      Eq. (1)

Number of waves of the average of the primary frequencies per beat $$n = \frac{\frac{B}{N} + \frac{A}{N}}{4\left(\frac{B}{N} - \frac{A}{M}\right)}$$

Compensation factor $\quad \dfrac{b}{a} = \dfrac{\frac{A}{M}}{\frac{B}{N}}$      Eq. (3)

Division ratio $R = \dfrac{\frac{B}{N}}{\frac{B}{N} - \frac{A}{M}}$      Eq. (4)

Factor of Merit $Z = \dfrac{1}{Re}$      Eq. (5)

The applications may be classified as:

1. Highest precision with minimal limitations on size or cost of components.
2. Medium precision. In this class may be small size devices suitable for personally-carried time pieces.
3. Relatively low precision with emphasis on low cost.

For Case 1 — Highest Precision. A high Z will be sought by minimizing R and $e$ consistent with the ability to compensate; see eq. (5). For example, with the 3rd overtone divided by 2, beat against the fundamental substituting in eq. (2) above,

B = 3, N = 2, A = 1, M = 1

$$N = \frac{\frac{3}{2} + 1}{4\left(\frac{3}{2}\right) - 1} = \frac{\frac{5}{2}}{4 \times 1/2} = \frac{5}{4}$$

It may be difficult to detect the beat as there are only 5/4 primary waves per beat $$\frac{b}{a} = \frac{1}{3/2} = \frac{2}{3}$$

It may be difficult to compensate the "b" factor to 2/3 of the "a" factor. Using the 1st harmonic and the 3rd harmonic divided by 4 B=1, N=1, A=3, M=4

$$n = \frac{1 + \frac{3}{4}}{4(1 - 3/4)} = \frac{7}{4} \text{ waves per beat}$$

The beat is detectable by filtering and injecting the filtered signal into a free running electronic oscillator.

$$\frac{b}{a} = \frac{3}{4}$$

Assuming this compensation is possible $$R = \frac{1}{1 - 3/4} = 4$$

For an E of .001

$$Z = \frac{1}{4 \times .001} = 250$$

Thus, there will result a beat frequency 250 times more constant than that of the primary oscillators.

Case 2 — Medium Precision. The proper compromises are chosen for the particular application.

Case 3 — Relatively Low Precision. For applications such as low-cost wrist watches or automobile clocks, perhaps a large frequency division is desirable to reduce or eliminate division stages. For example, if there need be no improvement in primary frequency accuracy, Z = 1, if $e$ can still be maintained at 0.001, then $$1 = \frac{1 - U/V}{.001}$$

$$\frac{U}{V} = .999$$

This could result from two frequencies of 100,000 and 99,900 yielding a beat of 100 which is utilizable in watches or clocks.

Some of the physical design factors to be considered are:

1. Type of vibration or oscillation, among which are electronic, transverse (flexure), extensional, torsional and shear types.
2. Type of sensors and excitation drive forces such as straight magnetic, magnetostrictive, electrostatic or piezoelectric, or electrostrictive.
3. Location and type of support points.
4. Placement of sensor and drive devices.
5. Compensation means.

FIG. 2a shows the lowest vibrating mode of a reed 21 vibrating transversely. This is here designated as the second harmonic so as to be compatible in the following discussion with the other vibrating types.

FIG. 2b shows the same reed 21 now called 22 flexurally vibrating at the lowest mode times 3, which will here be designated the 6th harmonic.

FIG. 2c shows companion rods or bars 23 and 26 supported at their centers vibrating at an extensional mode with motion and internal forces in line with the longitudinal axis of bars 23 and 26.

FIG. 2d shows companion rods 24 and 27 supported at their centers vibrating torsionally.

FIG. 2e shows companion structures 25 and 28 optionally supported at their centers vibrating in a shear mode.

The top line A N AA N A shows the position of nodes (N) and antinodes (A) along the bar for the lowest vibrating mode (fundamental) of 23, 24, 25, 26, 27 and 28 and for the lowest vibrating mode of 21.

The second line ANANANAANANANA shows the position of nodes and antinodes for the 3rd harmonic of 23, 24, 25, 26, 27 and 28.

Let 23 and 26 and 24 and 27 be identical with their axes on the same line. Let 25 and 28 be identical with their at rest axes on the same line. Let each pair 23–26, 24–27 and 25–28 be vibrating at the same harmonic mode, frequency, and amplitude, and at any given time, let the companion points 7 and 17 be moving as shown by the directional arrows. Points 7 and 17 can then be connected together with no change in vibratory conditions.

Thus, a given rod combination, such as 23 and 26, may be considered as a single unit and supported at the two nodes, each of which is one-quarter of the length inward from a rod end and is the vibratory equivalent of a rod of one-half the length supported at its center.

For a rod such as 23, rigidly supported at its center and vibrated at two harmonic modes, companion sensors and drive units are provided for each rod half for a total of 8 units altogether.

A partly flexible support permits energy to be transferred through the support points requiring only one sensor and one drive for each mode, being a total of 4 units altogether for any given pair of harmonic modes. Thus, for a minimum of sensor and drive units and to maintain the vibrating member in a proper position relative to sensors, drives and other components, flexible support at nodes one-quarter of the length from each end is preferable, and furthermore, the harmonic modes used will each be twice that of the equivalent rod of one-half the length.

TEST RESULTS

A working model for investigation and demonstration of the principles of this invention is shown in FIGS. 3a and 3b.

TABLE OF SIGNIFICANT DIMENSIONS

Note: All components except wiring on each side of rod center are matching with corresponding points equidistant from rod center.

|  |  | Inches |
|---|---|---|
| Permanent Magnet Diameter | A | ¼ |
| Rod Diameter | B | ⅛ |
| Measured from Coil Centers | C | 1¼ |
| Measured from Coil Centers | D | 1⅞ |
| Rod Length | E | 2 |
|  | F | 2¼ |
| Approximate | G | 3⅝ |
| Outer Dimension | H | 1 |
|  | I | ½ |
|  | J | ¾ |
| Magnet to Rod Spacing | K | ⅛ |
| Hole Diameter in Shield and in Paper Core of Coils | L | ⅜ |
|  | M | ⅝ |
|  | P | ⅝ |
|  | O | ½ |

An unmachined rod 1 of 75 percent cold worked Ni-Span-C was heat-treated seven hours at approximately 1200°F. A circular groove of the order of 0.001 inch depth was machined at the center of rod 1. Rod 1 was then mounted between 3 No. sewing needles 2, 3 and 4 by placing rod 1 to the right of needle 3 and below needle 4, and snapping rod 1 into place with an upward leftward motion. The pointed ends of needles 2, 3 and 4 engage the groove in rod 1. The lower ends were pressed into a soft wood block 5, and needle 4 was soldered into the groove in the head of a wood screw 6.

Standard 1 inch copper pipe caps 7 and 8, with centrally drilled ⅝ inch diameter holes, provided electric shielding and a mount for sensor coil 9 and drive coil 9a, for sensor coil 10 and drive coil 11, and for permanent magnets 14 and 15. Due to the motion of magnetic sites induced by the magnetic fields of magnets 14 and 15 near the rod ends, currents induced in 9 by extensional vibrations in 1 are amplified by transistor 12 producing currents in 9a of proper phase relative to the currents in 9 to sustain the desired harmonic mode in 1. A tuning and phasing capacitor 13 was selected to generate the first harmonic or fundamental in coils 9, 9a and rod 1.

Similarly, the fifth harmonic was sustained by the combined action of sensor 10, input phasing and tuning capacitor 16, transistor 17, coupling capacitor 18, transistor 19, drive coil 11, and tuning and phasing capacitor 20. There was a sufficiently negligible fifth harmonic component in the first harmonic network due in part to the swamping action of 13. There was a sufficiently negligible first harmonic component in the fifth harmonic network due in part to the high impedance of 18 for first harmonic frequencies.

The entire assemblage was enclosed in an aluminum box 22 to avoid a cycle or two frequently change when moved from the work bench into a refrigerator. Temperatures were read from a thermometer 23 enclosed within 22 and viewable through a slot (not shown) in 22.

Figure 3D:
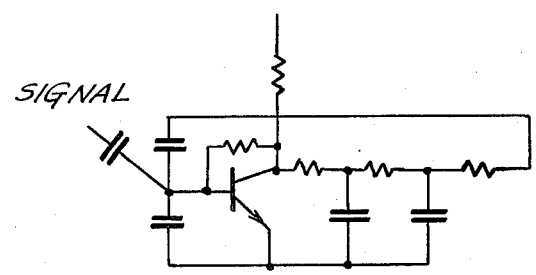
FIG. 3 shows a frequency generator designed in accordance with the principles of the present invention.
FIG. 3a shows some of the physical relationships of the components of FIG. 3 in greater detail.

Phase advanced oscillators as shown in FIG. 3c were used to multiply and divide frequencies up to 25,000 Hz. For frequencies between 25,000 and 500,000 Hz, phase delay oscillators were used as shown in FIG. 3d. With an oscillator set to run free at the desired multiple or submultiple, a small signal to the input of the transistor causes the oscillator to lock in at the desired multiple of submultiple.

To demonstrate an actual electronic beating together of two frequencies which are in the ratio of 5 to 6, the first harmonic was multiplied by 3, and the fifth harmonic divided by 2, the ratio being approximately $$\frac{5F}{2} \bigg/ 3F \text{ or } \frac{5}{6}.$$

Figure 4:
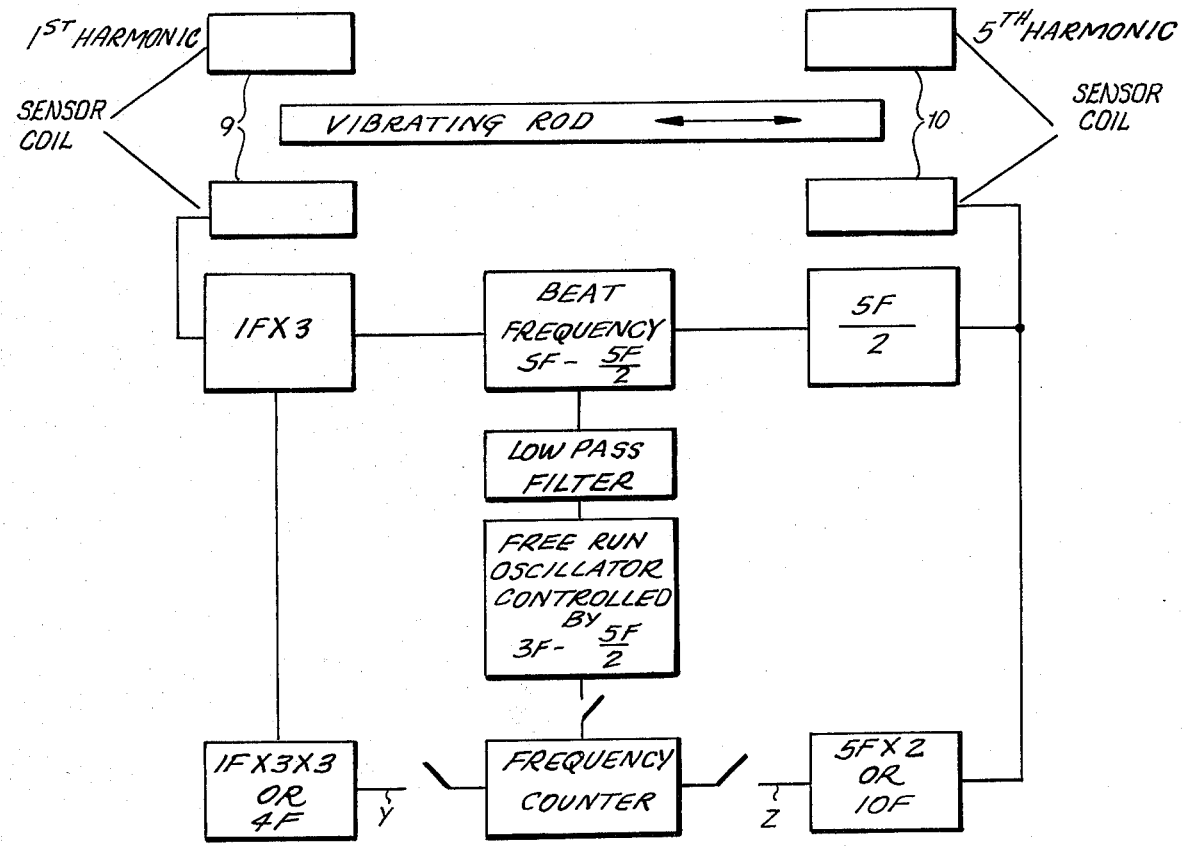
FIG. 4 shows a block diagram of a frequency generator embodying the principles of the present invention.

As shown in FIG. 4, the beat frequency was filtered, caused to control a free running oscillator, and then counted. The following values were obtained at room temperature:

| | |
|---|---:|
| Measured 1st harmonic × 3 | 147,024 |
| Measured 5th harmonic/2 | 122,012 |
| Computed beat frequency | 25,012 |
| Measured beat frequency | 25,012 |

Determination of the Z Factor for the Test Apparatus

With rod 1 of FIG. 3 vibrating longitudinally or extensionally and simultaneously at the first and fifth harmonics, these frequencies were measured as a function of temperature and with varied magnetic field conditions-normal field, reduced field and increased field. With magnet 21 placed with its N pole facing left, the field at the ends of rod 1 is reduced, with 21 removed the field is "normal," and with the N pole of 21 facing to the right, the field is increased. For greater accuracy of measurement, the first harmonic was multiplied by 9 and the fifth harmonic was multiplied by 2. The results are plotted as FIG. 5.

The changes in each frequency reduced to "F" is plotted in FIG. 6a, 6b and 6c. Zero reference frequency is at 90°F., and the incremental frequency change at 30° was computed from FIG. 5 by substracting the frequency at 90° from the frequency at 30°F. and dividing by 9 for the first harmonic and dividing by 10 for the fifth harmonic. These divisions then give the actual frequency change of the first harmonic and the "F" frequency change of the fifth harmonic (fifth harmonic frequency divided by 5).

Since the frequency change with temperature change is greater for the fifth harmonic/5, this then should be the lower of the two base frequencies in frequency division and beating.

The frequency change in the fifth harmonic divided by 6 and the frequency change in the first harmonic are plotted in FIGS. 6d, 6e and 6f. For decreased field, first harmonic change is lower than 5F/6, for increased field first harmonic change is higher than 5F/6, and for the normal field, which is adjustable, there is no observable difference between IF and 5F/6. The e Factor was defined as the ratio in the difference in frequency change to the actual change in a primary frequency. From FIG. 6e, the difference is of the order of .02 or less.

$$e = \frac{.02}{2}$$

$$e = .01$$

$$Z = \frac{1}{Re}$$

$$= \frac{1}{6 \times .01}$$

$$Z = 17$$

Thus by suitable frequency division, the test apparatus will yield a beat frequency of F−5F/6 = F/6 or a frequency of 8,000 + Hz with a temperature coefficient of frequency change 1/17th that of a primary rod frequency.

Additional Combinations

A variety of combinations are possible.

1. A submultiple of the constant beat frequency can be used to control the frequency of a lower frequency device, such as a tuning fork.

2. The lower frequency controlled by the contsant beat frequency can be another mode within the same structure. For example, a rod can be vibrating longitudinally from which a constant beat frequency is derived. The rod can simultaneously be vibrating in a flexing or torsional mode which is locked in to a submultiple of the beat.

3. Two different modes can be employed. For example, a bar or reed can be vibrating both flexurally and torsionally and a beat derived.

4. To achieve accurate low beat frequencies with a minimum of division stages, or no division stages, flexing or torsional modifications may be preferable due to their lower primary frequencies.

FIG. 7a shows the lowest vibratory mode of a single reed or bar. This mode as shown has the disadvantage that there is motion and energy loss at the support point 5. Bending the reed around, as shown in FIG. 7b, permits equal and opposite motion of the reed halves with little motion of the support points. This is, of course, the principle of the tuning fork.

FIG. 7c shows in perspective a reed with four equal arms, optionally at 90° to each other. With the sections 1 and 2 moving equal but opposite to sections 3 and 4, there is no motion at the central support point S.

Two members, as in FIG. 7c, with different frequencies suitably compensated, can be used to yield an accurate beat frequency according to the teachings of this invention.

FIG. 7d shows an 8-armed reed member. Arms 1, 3, 5 and 7 identical, with arms 1 and 5 flexing equal and opposite to arms 3 and 7. Similarly, with 2, 4, 6 and 8. The composite members 1–3–5–7 will be suitably different from composite member 2–4–6–8 in length, cross-section, composition or other physical characteristics, and will be suitably compensated to provide for a constant low beat frequency.

FIG. 7e shows a reedlike structure of compact form vibratable at two frequencies, with little or no motion of the support points 7 and 8. The central reeds 2 and 5 are each twice the width and mass of their associated side reeds 1–3 and 4–6. At a given time, with 2 flexing away from the reader, 1 and 3 will be flexing in unison toward the reader. The 1, 3, 4, 6 section of FIG. 7e will have a given natural frequency, and the 2, 5 section of FIG. 7e will have a different frequency, the two frequencies being suitably compensated to yeild a constant beat frequency.

The primary frequencies may be further reduced by tapering the reed arms from a narrow width near the support points to a greater width toward their free ends.

Electrostatic Sensor and Drive Methods

Heretofore, drive methods in commercial use have been either magnetic or piezoelectric. There are advantages in the use, for sensors and drives, of forces between positive and negative electric charges, as follows:

1. The material used for the oscillatory member need not be magnetic or piezoelectric. For example, fused quartz may be used in place of crystalline quartz.

2. Use of non-magnetic material eliminates frequency variations caused by magnetostriction and external magnetic fields including the earth's field.

3. Sensor and drive units may be of thin, light weight, low cost metal plates, as compared to wound coils for magnetic units.

4. There is less drain on cells or batteries, as there are negligible $I^2R$ losses in the wiring.

I have previously described the use of electrostatic means both as sensors and as drives for rotary motion in my article *High Rotational Speeds in Vacuum*, The Review of Scientific Instruments, Vol. 12, No. 1, 15-20, January 1941, the term "electrostatic" being somewhat a misnomer as intermediate or high frequencies are employed.

Figure 8A:
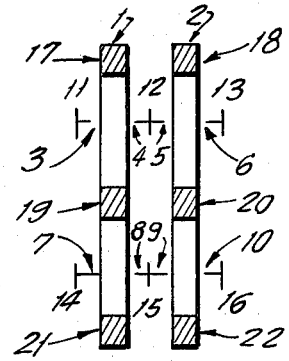
FIG. 8a shows another alternative embodiment for the frequency generating device of the present invention.
Figure 8C:
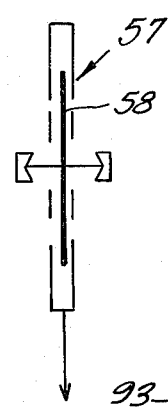
FIG. 8c shows another type of vibrating device which may be utilized in the present invention.

FIGS. 8a-8e show a method and apparatus using direct electric charge forces for production of a constant beat frequency and control thereby of low speed rotary motion or low frequency mechanical oscillatory motion. In FIG. 8a, 1 is a thin, flat flexing reed of highly elastic material, such as fused quartz, supported by 3, 4, 7 and 8 at nodes which are 1/4 of the length from each end, the flexing being toward and away from the reader. 3, 4, 7 and 8 are somewhat flexible and are attached to rigid base support projections 11, 12, 14 and 15. 2 may be a companion reed of different frequency than 1, or 2 may be a different harmonic mode within the same reed 1. 1 and 2 are compensated relative to each other so that any change in their frequencies results in a zero change in beat frequency, according to the teachings of this invention. Compensation may conveniently be achieved by making supports 3, 4, 7 and 8 of a different composition or dimensions than supports 5, 6, 9 and 10, thereby influencing the primary frequencies of 1 and 2 for proper compensation. 19 is a thin metal film sensor spot on the surface of one side of 1. 20 is a thin metal sensor film on one side of 2, or if 2 is a different harmonic of 1, then 20 is on the opposite side of 1 from 19. 19 and 20, though shown at the center, may in fact be at any point for optimum sensing of the harmonic mode desired. 17 and 21 are metallic drive films appropriately located on the same side of 1 as is 19, and similarly for drive films 18 and 22 on 2.

Figure 8D:
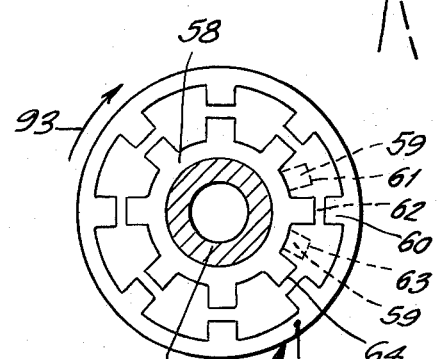
FIG. 8d shows the manner of flexure of the device of FIG. 8c.
Figure 8B:
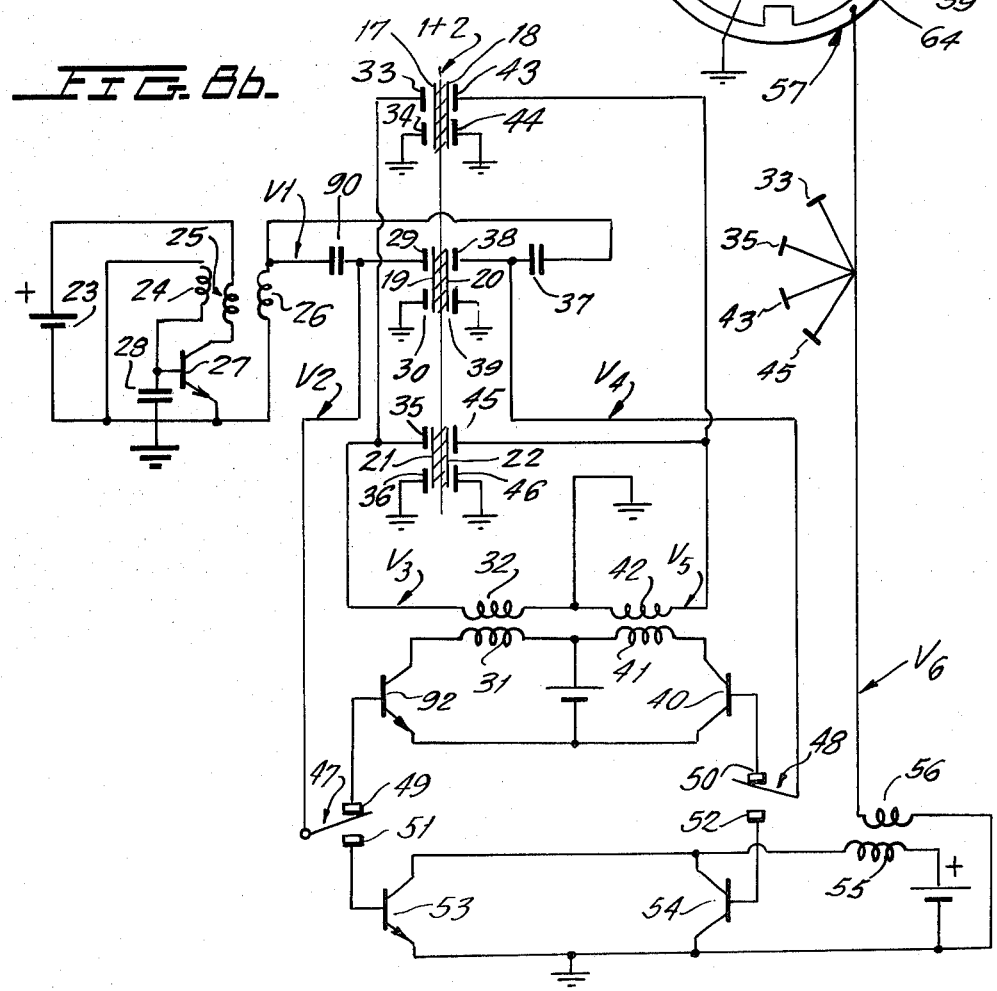

In FIG. 8b, battery or cell 23, feedback coil 24, coil 25, transistor 27 and capacitor 28, in combination, are an intermediate or high frequency oscillator. Coils 25 and 26 are a step-up transformer yielding an HF voltage $V_1$. A high frequency voltage $V_2$ of a lesser value than $V_1$ is developed between capacitor 90 and the combined capacitance of 29, 19 and 30. 29 and 30 are pickup metal plates mounted facing and close to 19.

Let 1 be in a state of flexure as shown by the solid line of FIG. 8d. If 19 now moves to the left, the capacitance of 29-19-30 increases and voltage $V_2$ drops. $V_2$ meanwhile is amplified by transistor 92, stepped up by HF transformer 31-32 and applied to drive plates 33 and 35 adjacent 17 and 21 respectively. The lowered value of $V_2$ causes a lowered value of $V_3$, less attraction between charges on 33-35, less leftward force on 17 and 21, and hence a rightward motion of 17 and 21. When 1 reaches a flexure limit determined by all factors as shown by the dotted line of FIG. 8d, the process reverses. Thus, the reed 1 vibrates at its natural harmonic mode, $V_1$ is also applied through capacitor 37 developing $V_4$. Similarly as with reed 1, reed 2, or the harmonic mode 2 of reed 1, is generated by the combined action of $V_4$, 40, 41, 42, $V_5$, 43, 18, 44, 45, 22 and 46. Voltages $V_3$ and $V_5$ are the HF voltage $V_1$ modulated at the respective natural frequencies of 1 and 2. $V_3$ and $V_5$ may each be rectified, optionally and variably divided, and combined to a constant beat frequency by methods of this invention.

For 1 and 2 as separate reeds of similar structure and the same harmonic mode, preferably the second harmonic as defined hereinabove, the lower shown alternate circuit may be employed, wherein switch arms 47 and 48 are considered as connected to 51 and 52, respectively.

$V_2$ is amplified by 53, $V_4$ is amplified by 54, and these are combined to a stepped-up voltage $V_6$ which is applied to oscillator drive plates 33, 35, 43 and 45.

$V_2$ is the carrier frequency C modulated by the natural frequency U of 1 and similarly for $V_4$ and natural frequency V assuming all sinusoidal wave forms.

$V_2 = \sin C \sin V$
$V_4 = \sin C \sin U$
$V_6 = V_2 + V_4 = \sin C \sin V + \sin C \sin U = \sin C (\sin V + \sin U)$ $V_6 = 2 \sin C \sin 178 (V+U) \cos \frac{1}{2} (V-U)$ Thus, $V_6$ is the carrier frequency modulated by and further modulated by (V−U). This is the same situation $$\frac{V+U}{2}$$

as shown by FIG. 1 except that the sin 1/2 (V+U) curve of FIG. 1 now envelopes the carrier frequency C. $V_6$ may be applied directly to a stator 57 to cause synchronous rotation of a movable member 58 of FIG. 8b.

Rotor 58 has symmetrical projections 59 which when rotating become alternately closer to and further from projections 64, 66, etc. of the stator. As shown in the end view of FIG. 8c, the stator projections may partially enclose the rotor projections. The voltage $V_6$ applied to the stator induces opposite charges on the rotor, this being enhanced by the capacitance between 58 and a closely adjacent grounded ring which may optionally be double with one section on each side of 58.

Let the rotor be moving in the sense of arrow 93 and at a speed and position such that as 59 goes from a position 61 to a position 62 just opposite 60, the beat frequency voltage goes from 64 to 65 on the cos 1/2 (V−U) curve of FIG. 1. As 59 travels to the position 62 to 63, the beat frequency voltage drops from its value at point 65 to zero and then rises to its value at point 66. There is a greater forward pull on 59 in going from 61 to 62 than there is backward pull going from 62 to 63. Thus, the rotor will speed up until there is just sufficient excess of forward pull over backward pull to overcome friction losses. This arrangement also acts as a further frequency reducer as the rotary speed will develop a beat frequency in accordance with the number of projections.

FIG. 8e shows an apparatus and a method for control of a low frequency oscillation such as the balance wheel of a watch or clock. 78 is a member free to oscillate and constrained by a hair spring, not shown. High frequency voltage $V_1$ develops a lower HF voltage $V_7$ on quadrant plate 74 which partially encloses 78. $V_7$ is amplified by transistor 68, stepped up by HF transformer 70–72 to a value $V_9$ which is applied to quadrant plate 76. A similar network applies a voltage $V_{10}$ to quadrant plate 77. In the posistion shown $V_9 = V_{10}$. If now 78 moves slightly in the direction shown by arrow 79, voltages $V_7$ and $V_9$ are diminished resulting in less attractive force between 76 and 78. Concurrently, $V_8$ and $V_{10}$ are increased resulting in increased attractive force between 77 and 78. Thus, 78 will oscillate at a natural frequency determined by its rotational energy and spring stiffness.

Injecting the beat frequency $V_6$ through 80 or 81, or injecting $V_2$ through 80 and $V_4$ through 81 will cause 78 to oscillate at the beat frequency or a submultiple of the beat frequency if the natural frequency of 78 is very close to the beat frequency or a subharmonic of the beat.

Since a watch hair spring arrangement is well known and quite accurate, the arrangement of FIG. 8e should permit resonance with submultiples as great as 1/1000 th. Thus, an accurate beat frequency of 5,000 per second can control a hair spring oscillation of 5 per second.

Compensation Methods

1. Support points, suitable material, shapes, etc.
2. Magnetostriction
3. Variable heat treatment of Ni Span C at nodes of separate harmonics.
4. In crystalline piezo quartz, fuse the quartz at selected support points.
5. Evaporated or other applied metals along a fused quartz rod.
6. Quartz rod part crystalline — part fused.
7. Expansion of fused quartz changes in end capacitor.

Using the principles herein disclosed, one, two, or any greater (more) number of oscillation modes may be generated, detected, optionally divided and utilized. Referring to FIG. 9, 81 is a mechanical oscillator which may be of any form but conveniently is a rod oscillating extensionally at any desired number or choice or modes, fundamental, first, second, third, etc.

All frequencies are sensed or picked up by 82 and amplified by 83. 84 passes only the frequency of mode A with optional amplification and similarly, 85 with mode B, 86 with mode C, etc. The outputs of 84, 85, 86, etc., are fed through impedances 89, 90 and 91, respectively, through amplifiers 92, 93 and 94, respectively, to drive member 87 for sustaining all of the frequencies. The composite of the frequencies may be utilized from lead 88.

Each frequency may be independently divided by 96, 97 and 98, respectively, and their composite utilized at lead 95, or any or all combinations of the divided frequencies may be beat together in mixers 99, 100 and 101, etc., and utilized either as composites or individually.

This method is applicable to all sensor-drive methods whether magnetic, magnetostrictive, piezoelectric, electrostatic or electrostrictive.

Although there have been described preferred embodiments of this novel invention, many variations and modifications will now become apparent to those skilled in the art. Therefore, this invention is to be limited not by the specific disclosure herein, but only by the appending claims.

the embodiments of the invention in which an exclusive property or privelege is claimed are defined as follows:

1. A electromechanical oscillator device comprising: a vibratory means capable of physical vibration at two discrete substantially harmonically related detectable frequencies;
   first means for activating said vibratory means to effect its vibration;
   second means responsive to said vibration of said vibratory means and generating electrical signals representative of the vibratory frequencies;
   third means for frequency multiplying at least one frequency of the output of the second means to which it is coupled;
   fourth means coupled to said third means for frequency dividing at least one of the output signals of the third means;
   fifth mixing means coupled to the third and fourth means for mixing the third and fourth means output signal frequencies to produce a beat frequency, whereby said beat frequency is more stable than the vibratory means frequencies.

2. The device of claim 1 further comprising sixth means coupled between said third means and said fourth means for frequency multiplying at least one of the output signals of the third means.

3. The device of claim 1 wherein said first means comprises electromagnetic drive means for generating an electromagnetic field to energize said vibratory means.

4. The device of claim 1 wherein said vibratory means is an elongated rod.

5. The device of claim 1 wherein each of said second means is comprised of means for magnetically detecting the vibrations of said vibratory means to generate said electrical frequency signals.

6. The device of claim 1 wherein said vibratory means discrete frequencies constitutes a fundamental frequency and an nth harmonic of the fundamental frequency.

7. The device of claim 1 wherein said vibratory means generates discrete frequencies which constitute a fundamental frequency and an overtone thereof wherein said overtone is approximately $m(2n+1)$ times the fundamental frequency, where $n = 0, 1, 2, \ldots, n;$ and $m = 1, 2.$ 8. The device of claim 1 wherein each of said second and third means comprises means capacitively coupled to the vibratory rod for generating electrical frequencies resulting from the varying capacitive coupling due to the vibratory motion of said vibratory means.

9. The device of claim 1 wherein said vibratory means is an elongated rod and said vibration occurs longitudinally in the direction of elongation.

10. The device of claim 9 further comprising means for supporting said vibratory means at at least two of its node points, said second means being positioned adjacent at least two of the antinode points of the vibratory means.

11. The device of claim 1 wherein said vibratory means is an elongated rod;
support means for supporting the rod at one of its node points;
said rod being adapted for vibrating in a direction transverse to its elongation;
said detection means each being positioned adjacent respective antinodes of the elongated rod.

12. The device of claim 1 wherein said vibratory means is comprised of an elongated member having a central portion containing at least two node points and a plurality of extending arms extending away from said central portion in at least first and second direction, said extending arms each having at least one antinode;
said detection means being positioned adjacent at least two of said antinodes.

13. The device of claim 1 wherein said vibratory means comprises a plurality of arms arranged in radial fashion about a central portion of said vibratory means, said central portion comprising at least one node point;
means for supporting said vibratory means at said node point;
said arms having at least one antinode point at a position removed from said central point;
said second means each being positioned adjacent a node point of associated ones of said arms.

14. The device of claim 13 wherein said arms are adapted to experience vibration longitudinally in the direction of elongation of said arms.

15. The device of claim 13 wherein said arms experience vibratory motion in a direction transverse to the elongation of said arms.

16. An electromechanical oscillator device comprising first means for generating two discrete detectable frequencies;
a hair spring;
a rotatable member being connected to said hair spring at its center of rotation being adapted to charge said hair spring;
first, second, third and fourth drive means for generating electromagnetic fields to impart rotation to said rotatable means;
means for connecting said first and second frequency signals to said first and second drive means;
means coupled to said first and second frequency generating sources for phase shifting their outputs and coupling the phase-shifted outputs to the third and fourth drive means, whereby the frequency signal coupled to said first and second drive means and said third and fourth drive means through said phase shift means imparts rotation to said rotatable means which is thereby adapted to rotate in reciprocating fashion at a frequency which is a very small submultiple of the beat frequency of said first and second frequency generating sources.

* * * * *